Figure 1:
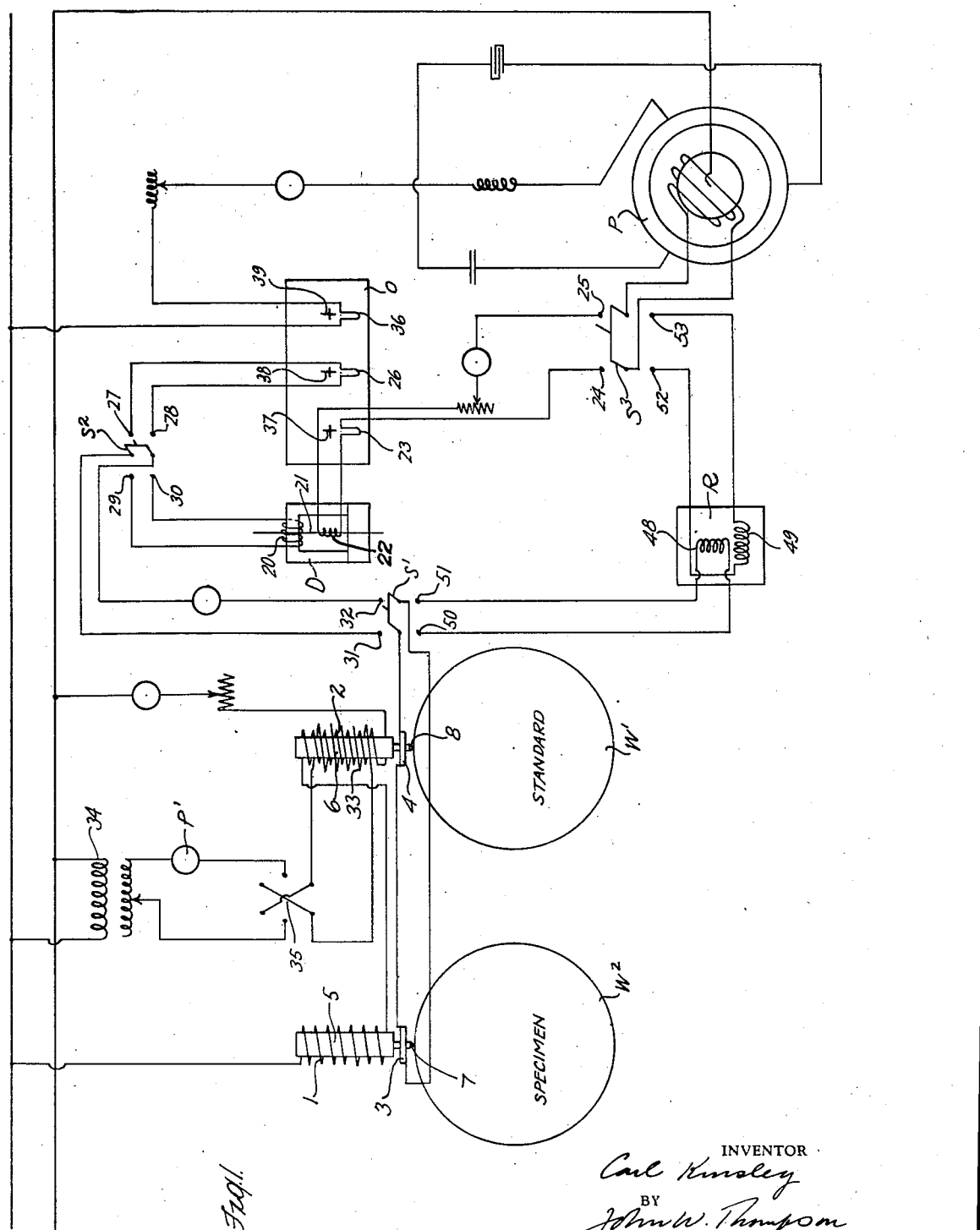

Feb. 3, 1931.                C. KINSLEY                1,790,819
           METHOD OF AND APPARATUS FOR MAGNETIC TESTING
                  Filed Feb. 15, 1928      3 Sheets-Sheet 2

INVENTOR
Carl Kinsley
BY
John W. Thompson
his ATTORNEY

Feb. 3, 1931.   C. KINSLEY   1,790,819
METHOD OF AND APPARATUS FOR MAGNETIC TESTING
Filed Feb. 15, 1928   3 Sheets-Sheet 3

INVENTOR
Carl Kinsley
BY
John W. Thompson
his ATTORNEY

Patented Feb. 3, 1931

1,790,819

UNITED STATES PATENT OFFICE

CARL KINSLEY, OF SCARSDALE, NEW YORK, ASSIGNOR, BY MESNE ASSIGNMENTS, TO MAGNETIC ANALYSIS CORPORATION, OF LONG ISLAND CITY, NEW YORK, A CORPORATION OF NEW YORK

METHOD OF AND APPARATUS FOR MAGNETIC TESTING

Application filed February 15, 1928. Serial No. 254,388.

The present invention relates to an improvement in method of and apparatus for magnetic testing. In my previous application, Serial No. 170,195, filed February 23, 1927, I have described and claimed an improved method and apparatus by the use of which it is possible to secure more accurate and informative data for determining the presence of magnetism affecting properties or characteristics in a given material as well as the identity of said properties or characteristics. One of the objects of the present invention is to provide a suitable method of and apparatus for more readily and accurately testing magnetizable articles in which information is desired as to a part only of the article to be tested. For example, there are certain highly desirable and in some cases necessary properties or characteristics of an economically practicable railway car wheel, such as hardness, homogeneity and toughness, which are most important in so far as they occur in a relatively narrow annulus below the outer or peripheral surface of the wheel and which, with other factors constant, vary according to the time and other conditions incident to quenching. The same properties may or may not be present in more centrally located portions without greatly affecting the durability and operativeness of the wheel. Accordingly, it is a further object of the present invention to provide a method of and apparatus for testing a portion of a magnetizable specimen to determine the presence and identity of certain properties or characteristics in an exposed portion of the specimen which are associated with certain quenching conditions. In use, therefore, the method and apparatus hereinafter to be described are intended to provide a practicable test to readily determine the identity of certain properties and characteristics of the specimen associated with quenching and the degree to which these properties or characteristics vary from a standard. It is believed also that my improved method and apparatus may be used to determine the curve of the relation of these properties or characteristics or any of them, to the depth of metal below an outer or exposed surface of the specimen. It is contemplated that this invention in its various aspects may be advantageously applied in the testing of magnetizable articles or specimens of varying shapes and sizes previously subjected to treatment which affects the properties or characteristics of a portion of the article similarly or to a similar extent.

I am aware that methods of testing isolated portions of magnetizable specimens have been disclosed in which a U-shaped electromagnet is employed in combination with a testing coil. Where the pole ends of said magnets are of substantial area, it has been found in testing certain types of specimens that variations in the magnetic flux due to variation in the air gap between the specimen and the pole ends has been of greater magnitude than the variation in the magnetic flux due to variations in the properties or characteristics of the specimen. A further object of the present invention therefore has been to minimize so far as possible the effect of variation in magnetic flux due to changes in the air gap so that the significant flux variations due to variations in properties or characteristics of the specimen may be the more readily and clearly segregated or defined and observed.

A further difficulty encountered in the use of apparatus in which a testing coil is positioned in the field of a testing magnet is that quantitative and qualitative effects due to properties or characteristics of the core itself or of one core where two are used in a comparative method. Under these circumstances, changes in the strength of the magnetizing current may fail to produce clear manifestations in the test circuit from which accurate conclusions may be drawn as to the extent to which a variation of the property or characteristic of the specimen is present. A further object, therefore, of the present invention has been to provide a testing method and apparatus in connection with which informative data may be secured as to the extent to which certain properties or characteristics of the specimen vary from those of the standard by observing flux variations attendant upon variations in strength of the magnetizing current. For the purposes above indicated, I prefer a magnet or testing unit having a core with an attenuated pole forming a relatively constricted portion adjacent to its point of contact or of nearest approach to the specimen and a testing coil adjacent to said constricted portion. In such a device the magnetic or flux density at the pole end or constricted portion can be made to reach a condition approximating saturation, after which if the magnetic flux is increased still further by increasing the magnetizing current, the region of such saturation is extended in the specimen either on the surface thereof or to an increasing depth therein or both. Therefore, with the testing coil positioned as stated, it will be particularly sensitive to flux variations occasioned by variations in the specimen, and where the induced currents are small the character of their variations can be observed and interpreted by reference to suitable sensitive instruments. The extent to which increase of saturation or flux density takes place in the specimen adjacent to the pole with increased magnetizing current and attendant character variations in the flux depend in part on the relative hardness of the outer and inner portions affected and upon other characteristics of the material which have to do with its permeability.

My invention also contemplates the use of an oscillograph vibrator suitably positioned in the magnetic circuit and adapted to indicate by means hereinafter to be described not only the presence and identity of property or characteristic variations in the specimen, but also to indicate the extent to which such variation in the specimen occurs in relation to the standard. In commercial practice, I prefer to employ the comparison method, or one in which a specimen is tested directly with a standard of known properties and characteristics and in which the significant flux variations occur in a differential secondary. For this purpose the test or secondary circuit contains two test coils each operatively related as above indicated to corresponding magnets having substantially the same constants, a pole end of one of said magnets being applied to a standard object and a pole end of the other to the specimen to be tested.

Ordinarily, it is unlikely that both magnets will produce exactly equivalent magnetic effects at all contemplated values of the magnetizing current. Such variations may possibly be attributed to core effects. But, whatever the cause, it is important to provide means for readily nullifying the unbalance here referred to. Apparatus for such purpose constitutes another feature of my invention, it being desirable in a commercially operative testing system to introduce this correction accurately and quickly.

Figure 2:
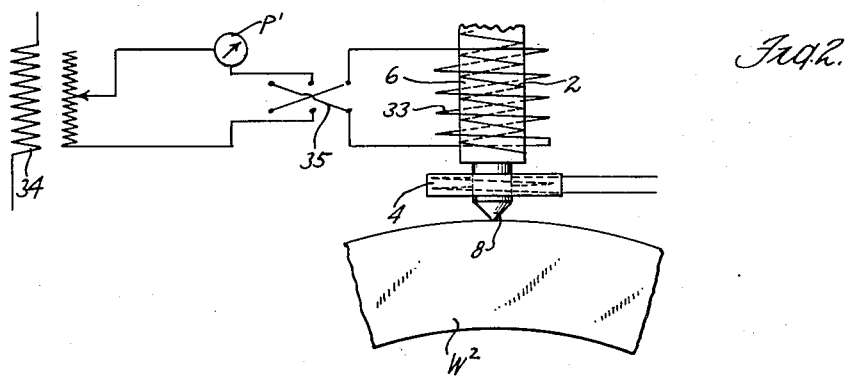
Figure 3:
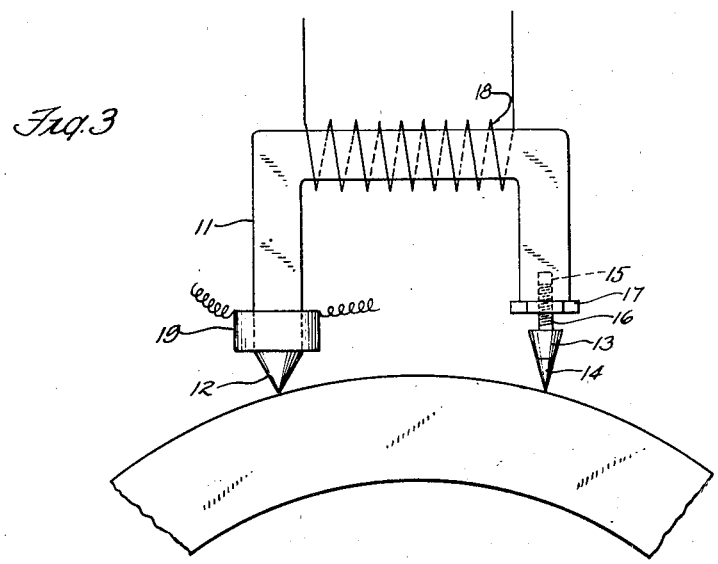
Figure 4:
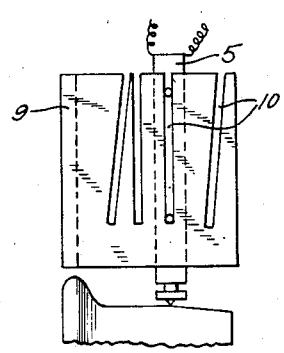
Figure 5:
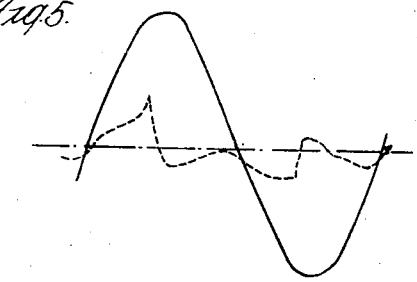
Figure 8:
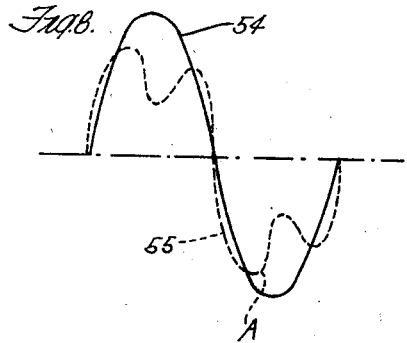
Figure 6:
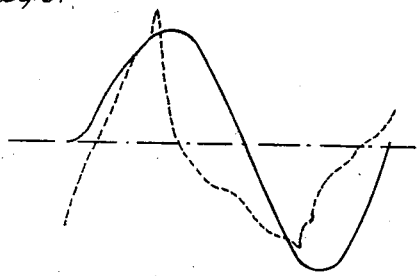
Figure 9:
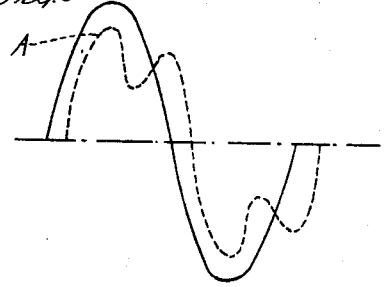
Figure 7:
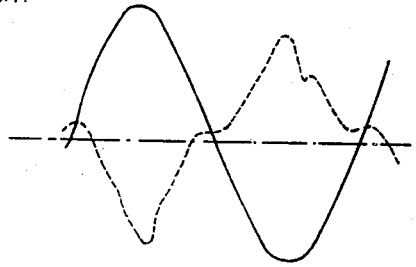
Figure 10:
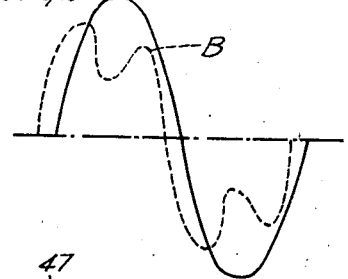
Figure 11:
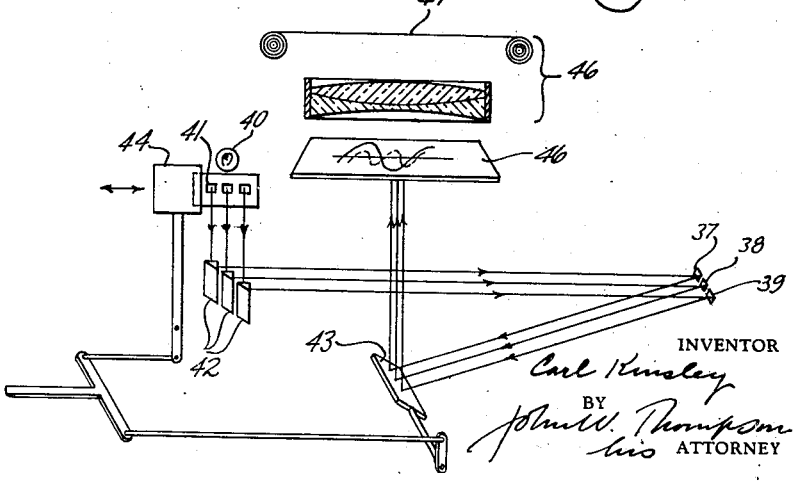

One embodiment of my invention is illustrated in the drawings accompanying the present specification and in which Figure 1 is a wiring diagram of testing apparatus employing magnets of bar form;

Figure 2, a detail of the testing magnet shown in connection with the apparatus illustrated in Figure 1;

Figure 3 an alternative form of magnet adapted to be used in connection with the apparatus illustrated in Figure 1;

Figure 4, a diagram representing one form of mounting for positioning a magnet at different angles with respect to the surface of a test piece;

Figure 5, shows lines representing wave form images which indicate the relative positions and magnitudes of current components of a periodic or magnetizing current and a differential secondary resulting from flux variations due to variation of the specimen from the standard in respect to a property depending on duration of quench, the quench indicated being of slightly longer duration than that of the standard;

Figure 6, the same as Figure 5 except that the irregular line indicates a more pronounced variation of the specimen from the standard and a longer duration of quench than that of the specimen referred to in connection with the description of Figure 5;

Figure 7, the same as Figures 5 and 6 except that the irregular line indicates a variation of the standard from the specimen in that the duration of quench has been less than that of the standard and of the specimens previously referred to;

Figure 8, a diagram representing a magnetizing current and an induced differential in phase;

Figures 9 and 10, diagrams representing different phase relations between a primary energizing current as in a relay or a dynamometer and an induced differential where phase adjustment of current in the relay primary has been effected in opposite directions; and, Figure 11, a diagram of an optical system for producing the wave form images referred to in connection with the description of Figures 5 to 7 inclusive.

Referring to the drawings, a preferred embodiment of my improved apparatus includes a pair of suitable electro-magnets having coils 1 and 2 respectively, arranged in series preferably in a periodic magnetizing circuit. I have also provided a pair of secondaries or testing coils in the fields of said magnets and comprising the opposed or bucked coils 3 and 4 respectively arranged in a suitable testing circuit. For preliminary investigation and the determination of critical variations and relay calibration, this circuit is adapted to include means for producing a visible representation of the wave forms of differential currents induced therein and a suitable dynamometer, the function of which will be more fully explained hereinafter. For commercial purposes or shop operations the secondary or testing circuit is adapted to include a properly calibrated relay for operating suitable signaling devices of any desired well known type or other type such for example as a buzzer, a bell, a light, a marking device or the like.

As shown in Figures 1 and 2, the coils 1 and 2 respectively, form parts of magnets having straight or bar cores 5 and 6 respectively, each provided with an attenuated pole or contact member 7 and 8 respectively, the contact or terminal portions of which are preferably substantially pointed or of the contour of a portion of a small sphere and hardened if desired. For testing the properties of car wheels, magnets of the type hereinabove described and shown in Figure 2 are tiltable or otherwise movably mounted in such a way that their contact points or ends may be adjusted to engage a succession of points in a line extending transversely across the periphery of a wheel. A suitable mounting for this purpose is indicated in Figure 4 in which a housing 9 is provided with guiding members such as slots 10 extending in predetermined angular relation and each adapted to maintain the magnet core 5 with its central longitudinal axis disposed at a predetermined angle with respect to the surface of the car wheel. Obviously, similar or equivalent constructions will suggest themselves for use in testing similar specimens as well as specimens or articles having contours different from that of a car wheel. Where the testing magnet is of the U-form illustrated in Figure 3, a similar or other suitable mounting for said magnet is contemplated so that its poles may be positioned with their respective central axes occupying various predetermined angular relations with respect to the surface of the specimen.

As shown more clearly in Figure 3, said U-shaped magnet includes a U-shaped core 11 having one pole provided with a pointed or rounded contact member 12 preferably of magnetic material and the other pole provided with an adjustable pointed or rounded contact member 13 preferably of brass or other non-magnetic material and having an iron or steel tip 14 for contact with the specimen. For purposes of adjustment the latter pole or core 11 is provided with a threaded recess 15 adapted to receive a threaded portion 16 of the contact member 13. A locking nut 17 is mounted on the threaded portion 16 and in position to be moved into clamping engagement with the adjacent end of the recessed pole or core 11. This core is provided with a primary or magnetizing winding 18 and a testing coil 19 which corresponds in function to the testing coils 3 and 4 of Figure 1. The purpose of the adjusting means hereinabove described is to provide so far as possible identical air gap conditions as between the magnet which cooperates with the standard and that which cooperates with the specimen.

As indicated in Figure 1, the secondary circuit includes the fixed coil 20 of a dynamometer D having an indicator 21 mounted on a moving coil 22, which is in circuit with a vibrator 23 of an oscillograph O and a phase shifter P when a switch $S^3$ engages terminals 24 and 25 in said circuit. Another vibrator 26 of said oscillograph O is in the secondary or testing circuit when switch $S^2_a$ engages terminals 27 and 28 and is out of said circuit when switch $S^2$ engages terminals 29 and 30. The secondary circuit is closed through the dynamometer D or, depending on the position of switch $S^2$, through the vibrator 26, by means of a switch $S'$ engaging terminals 31 and 32.

With the apparatus thus far described, it is possible to ascertain whether or not the two testing magnets are in balance. To make this test with the bar type magnet, the contact member 8 of one magnet engages a standard wheel $W'$ while the other contact member 7 engages a specimen $W^2$. A magnetizing current of known value is applied to the windings of said magnets with switch $S'$ engaging contacts 31 and 32. On closing the circuit of coil 20, dynamometer deflection is noted. On closing the circuit of vibrator 26 a wave image of the induced differential secondary is presented and preferably recorded by photographs or other suitable means hereinafter to be described more fully in connection with Figure 10. These dynamometer and oscillograph records are made to cover a predetermined range of values of the magnetizing current. Interchanging the magnets, contact 8 is shifted to engage $W^2$ and contact 7 to engage $W'$ and observations similar to those above noted are made to corresponding values of the magnetizing current. In this operation it will usually be found that the dynamometer deflections or the sine wave image or both may indicate substantial balance as between the two magnets for certain values of the magnetizing current, whereas for other values a condition of unbalance may be shown. To minimize the error thus indicated, I provide a compensating device in the form of a supplementary coil 33 on one of the magnets and in a separate circuit preferably connected with the same source of current as the magnetizing circuit. This circuit also includes a phase shifter $P'$, a reversing switch 35 and a suitable variable resistance or other means for regulating the value of current in the supplementary coil 33. On the basis of the observations previously made, current is now applied through supplementary coil 33 either in an additive or subtractive sense to compensate for the quantitative variation previously noted for a certain value or certain values of the magnetizing current. But this correction changes the phase of the induced current, as may be shown by wave form images produced by vibrator 26 and in the dynamometer readings. To correct this, the phase shifter P' is adjusted until the induced secondary current approximately balances both in phase and amplitude with the magnets in interchanged positions. A vibrator 36 of oscillograph O gives a sine wave image of the main magnetizing current which may be compared as desired with wave form images produced by vibrator 26. In this way, the operator secures correction data for each value of the magnetizing current at which the magnets have failed to balance. It is noted here that the quantitative unbalance between said magnets manifested at certain values of the magnetizing current may be compensated for or neutralized by changing the air gap relation between one of the specimens and its applied contact point in any suitable manner as by the means indicated in Figure 3 or by inserting a non-magnetic shim in the form of a brass strip, for example. This mode of correction is not well suited to commercial practice for obvious reasons; but for research practice, it has the advantage that no substantial phase angle disturbance is produced.

With the testing factors constant or their variations compensated for in the above described or equivalent manner, the testing apparatus is ready to be utilized in specimen testing operations. In commercial practice, the investigator's requirements will usually be met by a test directed to determinations concerning one or two characteristics of the specimens. For example, with car wheels, assuming a uniformity of chemical composition within practical limits, the operator will be interested chiefly in the special effects due more particularly to heat treatment. To establish critical data in this respect a number of specimens are quenched under varying conditions. With a standard of known characteristics engaging a pole of one of said magnets, the specimens are exposed successively in similar contact relation in the magnetic field of the other magnet. With each specimen, dynamometer and oscillograph records are made, the latter being preferably in the shape of wave form images. By inspection and comparison it is ascertained that certain wave image contours associated with the differential secondary indicate variation with respect to the properties affected by variations in the time of quenching. A similar determination is made with respect to extent of variation of the investigated property, and in shop practice, it will be sufficient for the testing apparatus to show a predetermined minimum variation with respect to the desired property or characteristic in the specimen. The presence of a variation from the standard with respect to a certain property may be found to be more clearly ascertainable at one value of the magnetizing current, whereas the extent of said variation may be more clearly indicated at a different value of the magnetizing current. It is not unlikely, however, that in some cases a single value of the magnetizing current will give sufficiently complete and accurate indications for commercial purposes.

The wave form image producing means, hereinabove referred to as an oscillograph, may be of any appropriate type. That indicated in the drawings is illustrated diagrammatically in Figure 11. Referring thereto and to Figure 1, the oscillograph includes the vibrators 23, 26 and 36 associated with suitable optical systems and/or other means for producing and/or recording sine wave images. The apparatus shown includes mirrors 37, 38 and 39 respectively positioned in an optical system wherein a beam of light from a suitable source 40 passes through shutter-controlled apertures 41 and is reflected by prisms 42 to said respective mirrors and thence to a rocking or tilting reflector 43. The latter is pivotally mounted to rock periodically in synchronism with a shutter 44 controlling the apertures 41 and to transmit the reflected beam of light to a ground glass or other suitable means 45 upon which images of the light beam paths are presented. Photographic apparatus 46 of any or well known construction is positioned in the light beam paths in such a way that when the screen 45 is removed or displaced, a film or plate 47 will receive and record instantaneous or composite wave form images as desired.

In commercial operations it will not ordinarily be feasible to conduct all tests on the basis of visual comparison of actual photographs or other visual manifestations of variation between the standard and the specimen. In fact, it is desirable to utilize a suitable signal actuating mechanism which, upon the occurrence of predetermined current conditions in the secondary circuit will operate a bell, buzzer or other device as a signal. Such a signal, not shown, may be controlled or operated by means of a relay R, Figure 1, having coils 48 and 49, the former being in the secondary circuit with testing coils 3 and 4 when the switch S' engages the terminals 50 and 51. The other coil 49 is in circuit with the phase shifter P when switch S³ engages terminals 52 and 53.

Calibration of the relay R to indicate the occurrence of a critical variation of the specimen from the standard in the matter of time of quench, for example, is based on observations previously made in preliminary testing operations in which the significant contours of the wave form images will have been noted together with the phase relationship of said contours to the sine wave image of the magnetizing current. As shown in Figures 8, 9 and 10, the sine wave image of the magnetizing current is represented by the line 54 and a typical flux condition due to a variation in respect to magnetism affecting properties or characteristics will be represented by the irregular line 55. The line 54 occurs in connection with the operation of vibrator 36 and mirror 39, while line 55 occurs in connection with the operation of vibrator 26. Assuming that the loop A of line 55 represents a flux variation due to variation in respect to some particular property under investigation, the movement of the dynamometer indicator 21 will be brought about by a deflecting force proportional to the average value of the product of the instantaneous values of the primary and secondary currents operating in its fixed winding 20 and its movable winding 22. Therefore, where the primary current is constant the indicator is deflected by a current which could be represented diagrammatically by the sine wave equivalent of the secondary or induced differential current represented by the irregular line in Figures 8 to 10 inclusive. But, for reasons heretofore suggested, if a quantitatively controlled signal were produced under these conditions it might be misleading or ineffective to disclose the particular information sought. It therefore becomes desirable to diminish or reinforce the quantitative effect of one portion or another of the differential current by shifting the phase of the energizing current in coil 22. This is accomplished by adjusting the phase shifter P, Figure 1, one effect thereof being illustrated in Figure 9 where the current energizing the moving coil is shifted to coincide with the current component corresponding to loop A of the wave form image of a cycle unit of the induced differential current. The dynamometer deflection is now co-related quantitatively with the variation in the flux due to variation in that property in respect to which the investigation is being made and which is indicated by occurrence of the current characteristic represented by the loop A of the wave form image. In figure 10 the phase shift takes place in the opposite direction or in such a way as to correlate the dynamometer deflection with the occurrence of a variation in respect to a different property which, in the irregular line 55 is represented by loop B.

To make the phase angle adjustment hereinabove referred to, switch $S^3$ is closed into the termianls 24 and 25 and switch $S^2$ is closed into the terminals 29 and 30. Before phase adjustment, the oscillograph will produce the composite image shown in Figure 8. To effect a stronger deflection of the indicator 21 to emphasize the current component corresponding to loop A, the phase of current in the moving coil 22 is shifted so that the composite image will appear like that illustrated in Figure 9. By shifting the phase in the opposite direction, the other secondary current component represented by the loop B of the irregular line 55 will be brought into such relation to the magnetizing current of coil 22 that the occurrence of a variation in the property corresponding to that particular contour is emphasized in the secondary circuit and therefore in its effect on the dynamometer deflection. If the switch S' now be closed through terminals 50 and 51 and the switch $S^3$ be closed through terminals 52 and 53, it will be seen that the adjustment of the phase angle between the secondary current and the magnetizing current in coil 49 will be transferred to and made effective in the relay R which will be calibrated to operate on the occurrence of a predetermined minimum current value. Therefore, when a variation in a property of the specimen due to variation in time of quench, for example, takes place and such variation is of critical magnitude, a corresponding differential current in the secondary operates the relay and thus actuates a suitable signal, either directly, or preferably, by closing a circuit in which the signal device is operatively positioned as illustrated in my previous application hereinabove referred to.

I claim:

1. The method of testing a magnetizable body which includes simultaneously establishing a magnetic flux in a standard of known magnetism affecting properties and in said body respectively, producing for inspection a representation of the amplitude variation of a cycle unit of a secondary differential current produced by said magnetic fluxes due to a difference between said standard and said body in respect to a magnetism affecting property thereof and a representation of the amplitude variations of a corresponding cycle of the magnetizing force by reference to said representations, comparing the magnitude and phase relations of said current and said force, neutralizing the observed quantitative effect of the flux variations due to said difference between the standard and said body in respect to a magnetism affecting property thereof, varying the effective magnetizing force, and observing the effect of flux variations attendant upon said variations in the effective magnetizing force.

2. Apparatus for testing magnetizable objects comprising a pair of electromagnets having their magnetizing windings arranged in series, a secondary coil in the field of each magnet said coils being in bucked relation, means for varying the value of the magnetizing current in the magnetizing windings, a supplementary winding on one of said coils, and means for controlling the value and direction of current in said supplementary winding.

3. Apparatus for testing magnetizable objects comprising a pair of electromagnets having their magnetizing windings arranged in series, a secondary coil in the field of each magnet said coils being in bucked relation, means for varying the value of the magnetizing current in the magnetizing windings, a supplementary winding on one of said coils, and a phase shifter in circuit with said winding.

4. Apparatus for testing magnetizable objects comprising a pair of electromagnets having their magnetizing windings arranged in series, a secondary coil in the field of each magnet said coils being in bucked relation, means for varying the value of the magnetizing current in the magnetizing windings, a supplementary winding on one of said coils, means for controlling the value of current therein, and a phase shifter in circuit therewith.

In testimony whereof, I have signed my name to this specification this 14th day of February, 1928.

CARL KINSLEY.